(12) United States Patent
Lai

(10) Patent No.: US 7,032,092 B2
(45) Date of Patent: Apr. 18, 2006

(54) MEMORY CONTROLLER FOR SUPPORTING A PLURALITY OF DIFFERENT MEMORY ACCESSE MODES

(75) Inventor: Jiin Lai, Hsin-Tien (TW)

(73) Assignee: VIA Technologies, Inc., Taipei Hsien (TW)

( * ) Notice: Subject to any disclaimer, the term of this patent is extended or adjusted under 35 U.S.C. 154(b) by 433 days.

(21) Appl. No.: 10/236,794

(22) Filed: Sep. 6, 2002

(65) Prior Publication Data

US 2003/0070052 A1    Apr. 10, 2003

Related U.S. Application Data

(60) Provisional application No. 60/328,284, filed on Oct. 9, 2001.

(30) Foreign Application Priority Data

Jun. 18, 2002    (TW) ................ 91113215 A

(51) Int. Cl.
*G06F 12/00*    (2006.01)

(52) U.S. Cl. ............... 711/167; 345/534; 345/563
(58) Field of Classification Search .......... 711/105, 711/154, 167; 713/501, 502; 345/533, 534, 345/563; 365/233, 194, 189.02, 230.02, 365/230.03
See application file for complete search history.

(56) References Cited

U.S. PATENT DOCUMENTS

| | | | |
|---|---|---|---|
| 4,523,309 A * | 6/1985 | Piasecki et al. ............. | 370/286 |
| 6,091,663 A * | 7/2000 | Kim et al. ................. | 365/233 |
| 6,611,905 B1 * | 8/2003 | Grundon et al. ............ | 711/167 |
| 6,625,702 B1 * | 9/2003 | Rentschler et al. ......... | 711/154 |
| 6,681,301 B1 * | 1/2004 | Mehta et al. ............... | 711/154 |

* cited by examiner

*Primary Examiner*—Pierre M. Vital
(74) *Attorney, Agent, or Firm*—J.C. Patents

(57) ABSTRACT

A common DRAM controller is provided for supporting a plurality of memory types such as double data rate or quad data rate mode or types. The controller is adapted to use a number of clock signals to process data. The controller can further delay the data for a predetermined time period and capture the same.

14 Claims, 8 Drawing Sheets

MEMORY CONTROLLER FOR SUPPORTING A PLURALITY OF DIFFERENT MEMORY ACCESSE MODES

CROSS-REFERENCE TO RELATED APPLICATION

This application claims the priority benefit of U.S. provisional application titled "COMMON DRAM CONTROLLER SUPPORTS DOUBLE-DATA-RATE AND QUAD-DATA-RATE MEMORY" filed on Oct. 9, 2001, serial No. 60/328,284. All disclosures of this application is incorporated herein by reference. This application also claims the priority benefit of Taiwan application serial no. 91113215, filed Jun. 18, 2002.

BACKGROUND OF THE INVENTION

1. Field of the Invention

The present invention relates to a controller for supporting a plurality of different memory access.

2. Description of the Background Art

DRAM has evolved from asynchronous DRAM to synchronous DRAM. For example, Fast-Page DRAM and Extended Data Output (EDO) DRAM have evolved to Synchronous Dynamic Random Access Memory (hereinafter abbreviated to SDRAM). Currently, high speed memory banks generally use synchronous source methods for achieving data transmission. By way of an example, Double Data Rate dynamic random access (hereinafter abbreviated to DDR SDRAM) memory bank is one of the methods. In addition, these high speed memory banks require differential signals for data transmission. Therefore, real high access speed for DRAMs requires differential signaling. It is desirous to combine source synchronization with differential signaling.

Furthermore, DRAM market tends to be outpaced in bandwidth by such elements as processor, I/O devices, or graphic add-on devices. This deficiency in bandwidth becomes especially significant for high volume data transfer applications such as Internet applications.

In order to further improve the bandwidth, schemes such as Double Data Rate (DDR), Quad Band Memory (QBM), and Quad Data Rate (QDR) are capable of transmitting four units of data as compared to a single unit for the baseline rate. Further, the above has the advantage of using existing low-cost technology for increasing the bandwidth.

Memory having different data rate or data types generally requires different and separated memory controllers for each and every data type. A number of memory controllers may be required for a single application. Further, more controllers complicate the system and can be space consuming and expensive.

As can be seen, there is a need for a single memory controller which controls different memory types or modes.

SUMMARY OF THE INVENTION

A common DRAM controller is provided for supporting a plurality of memory types such as double data rate or quad data rate mode or types. The controller is adapted to use a number of clock signals to process data. The controller can further delay the data for a predetermined time period and capture the same.

Accordingly, a memory controller for supporting different memory modes is provided. The memory controller has a determining device, a memory writing device, and a memory reading device. The determining device used for determining a memory mode. The determining device generates a memory selection signal. A memory writing device uses the memory selection signal to provide a data selection signal, wherein the data selection signal is chosen from a first clock signal or a second clock signal. The memory writing device further provides a data mask signal, wherein the data mask signal is chosen among a byte mask signal, a third clock signal, or a fourth clock signal. The memory writing device still further provides a memory data signal, wherein multiunit data are adapted to be carried therein. The memory data signal is controlled by the fourth clock signal or a fifth clock signal. A memory reading device for receiving the data selection signal, the data mask signal, and a reference voltage is provided. The memory device provides at least one differential signal and chooses the one differential signal based upon the memory selection signal and delay the one differential signal for a predetermined time period for locking data on the memory data signal.

Accordingly, a memory controller for supporting different memory modes is provided. The memory controller has a determining device, a memory writing device, and a memory reading device. The determining device used for determining a memory mode, and generates a memory selection signal. The memory writing device uses the memory selection signal to provide a data selection signal, wherein the data selection signal is a first clock signal. The memory writing device further provides a data mask signal, wherein the data mask signal is chosen from a byte mask signal or a second clock signal. The memory writing device still further provides a memory data signal, wherein multi-unit data are adapted to be carried therein. The memory data signal is controlled by the second clock signal or a third clock signal. The memory reading device is used for receiving the data selection signal, the data mask signal, and a reference voltage. The memory device provides a differential signal and chooses the differential signal based upon the memory selection signal. The memory device further delays the differential signal for a predetermined time period for locking data on the memory data signal.

Accordingly, a receiver used in a memory controller disposed to use a plurality of clock signals for supporting different memory modes is provided. The receiver has a first differential buffer, a second differential buffer, and a multiplexer. The first differential buffer is used for comparing the data selection signal with the reference voltage and provides a first differential output signal. The second differential buffer is used for comparing data selection signal with a data mask signal and provides a second differential output signal. The multiplexer is used for selecting an output thereof between the first differential output signal or the second differential output signal according to a memory selection signal.

Accordingly, a receiver used in a memory controller disposed to use a plurality of clock signals for supporting different memory modes is provided. The receiver has a multiplexer and a differential buffer. The multiplexer is used for generating an output by selecting between a reference voltage and a data mask signal as an output according to the memory selection signal. The differential buffer is used for comparing data selection signal with the output and provides a third differential signal.

Accordingly, a data selection signal delay circuit adapted to be used in a memory controller for supporting different memory modes is provided. The data selection signal delay circuit has a first delay circuit, a second delay circuit, and a multiplexer. The first delay circuit is used for receiving a differential signal. After delaying the differential signal for a predetermined time period, the first delay circuit providing a first delay signal. The second delay circuit is used for receiving the differential signal. After delaying the differential signal for a predetermined time period, the second delay circuit provides a second delay signal. The multiplexer is used for providing an output, wherein the output is based upon a selection between the first delay signal and the second delay signal. The selection based upon information carried by a memory selection signal.

Accordingly, a data selection signal delay circuit adapted to be used in a memory controller disposed to use a plurality of clock signals for supporting different memory modes is provided. The data selection signal delay circuit has a multiplexer and a programmable delay circuit. The multiplexer is used for providing an output selected between a first delay selection signal and a second delay selection signal. The selection is based upon information contained within the memory selection signal. The programmable delay circuit is used for receiving the output and a differential signal, and provides a time delay, wherein signal passing through the data selection signal delay circuit is delayed for a predetermined time period.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
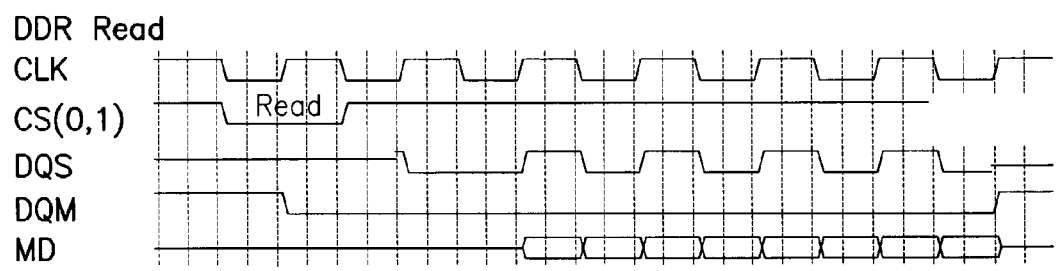
FIG. 1 is a timing diagram of the present invention depicting a reading using DDR SDRAM.

Referring to FIG. 1, a timing diagram of the present invention depicting a reading process using DDR SDRAM is shown. CLK denotes a memory clock signal having a fixed frequency. When chip selection signal CS (0,1) is activated, the DDR SDRAM starts the reading process. As shown in FIG. 1, DDR SDRAM uses memory data signal (MD) to carry requisite data. The data segments correspond with the rising edges and the falling edges of data selective pass signal (DQS) respectively. As can be appreciated, in order to lock the memory data signal (MD), data selective pass signal (DQS) is required to have a time delay or a time lag. The time lag is usually one fourth of the clock CLK cycle.

Figure 2:
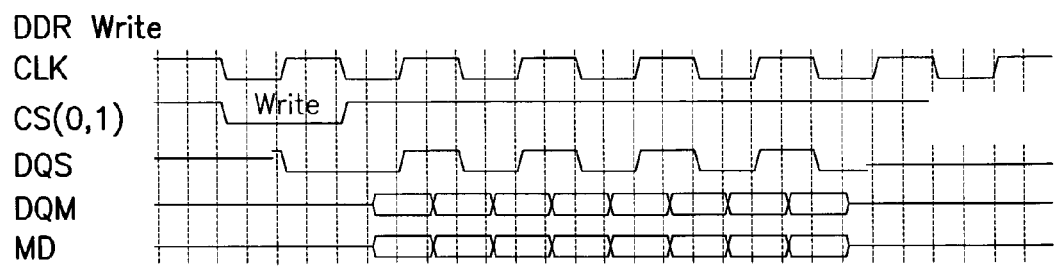
FIG. 2 is a timing diagram of the present invention depicting a writing using DDR SDRAM.

Referring to FIG. 2, a timing diagram of the present invention depicting a writing process using DDR SDRAM is shown. CLK denotes a memory clock signal having a fixed frequency. When chip selection signal CS (0,1) is activated, the DDR SDRAM starts a writing process. As shown in FIG. 2, data selective pass signal (DQS) from the memory controller has the same frequency as CLK. Data mask signal (DQM) carries byte mask data, while memory data signal (MD) carries data for writing. A predetermined phase or time lag exists between data selective pass signal (DQS) and data mask signal (DQM), as well as between memory data signal (MD). In other words, data selective pass signal (DQS) possesses a time lag in relation to both data mask signal (DQM) and memory data signal (MD). The time lag may be expressed as one fourth of the memory clock cycle. Because of this time lag, DDR SDRAM can lock data of the data mask signal (DQM), and lock data of the memory data signal (MD).

Furthermore, Taiwan patent number 89116720 filed on Aug. 18, 2000, entitled "A Buffer for Altering Data Storage and Retrieval Rate and the System Therefore", which is hereby incorporated by reference in its entirety. Said Taiwan patent teaches a buffer chip capable of transmitting four units of data with a clock cycle (Quad Data Rate, "QDR" hereinafter) to increase the bandwidth of memory banks. The buffer chip is interposed between DDR SDRAM and the memory control chip. In other words, the inventive buffer chip has a first end coupled to the DDR SDRAM, and a second end coupled to the memory controller.

Figure 3:
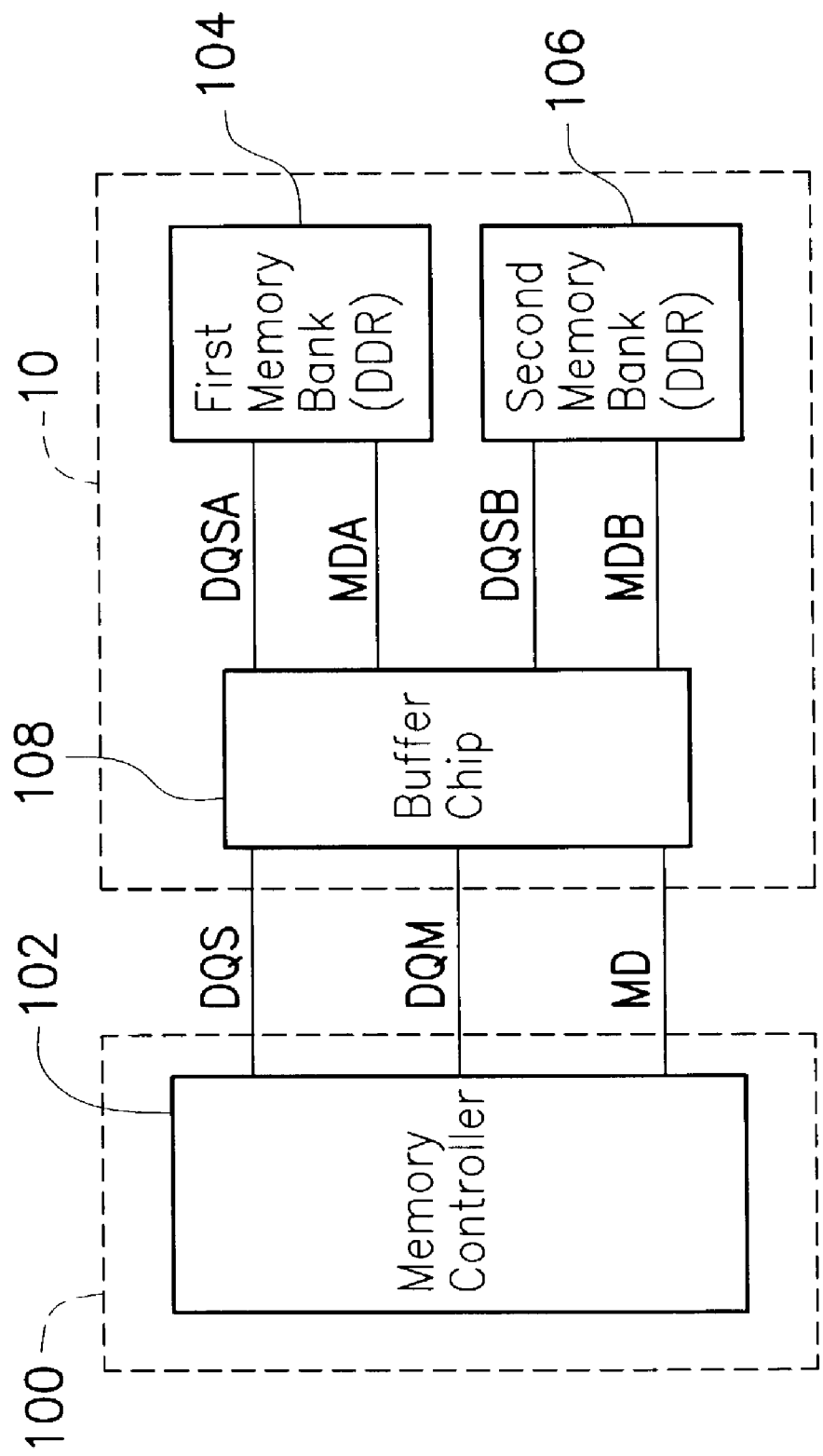
FIG. 3 is a block diagram of the present invention depicting a memory controller coupled to a QDR structure.

Referring to FIG. 3, a block diagram depicting the relationship between memory controller 102 and the QDR structure 10 is shown. Memory controller 102 resides within control chip 100. QDR structure 10 comprises buffer chip 108, wherein a plurality of first-in first-out (FIFO) buffers are located. This doubles the data rate for reading and writing of a first data selection signal (DQSA), and a first data signal (MDA) of a first memory bank 104 of the DDR SDRAM structure. Similarly, the rate is also doubled for a second data selection signal (DQSB) and a second data signal (MDB) of a second memory bank 106.

The signals between memory controller 102 and buffer chip 108 operate and four times faster than a baseline rate. The signals comprises data selection signal (DQS), data mask signal (DQM), and memory data signal (MD). Therefore, four units of data can be transmitted within one memory clock cycle.

Figure 4:
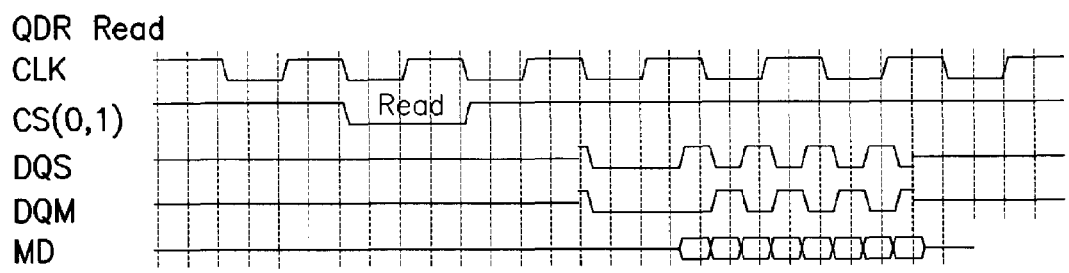
FIG. 4 is a timing diagram of the present invention depicting a reading of the QDR structure.

Referring to FIG. 4, a timing diagram for a reading of the QDR structure is depicted. CLK denotes a memory clock signal. When chip selection signal CS (0,1) is active, the QDR structure starts its operation. According to the instant figure, data selection signal (DQS) processes of frequency is twice the frequency of memory clock signal (CLK). Furthermore, memory data signal (MD), corresponds to the rising edges and the falling edges of data selection signal (DQS). Data mask signal (DQM) is the reverse of data selection signal (DQS). In other words, a 180 degrees phase difference exists between the two signals. As can be appreciated, memory controller 102 needs to cause a predetermined time lag in data selection signal (DQS) and in data mask signal (DQM) in order to lock the data contained in the memory data signal (MD). Usually, the time lag is about ¼ of the memory clock CLK cycle.

Figure 5:
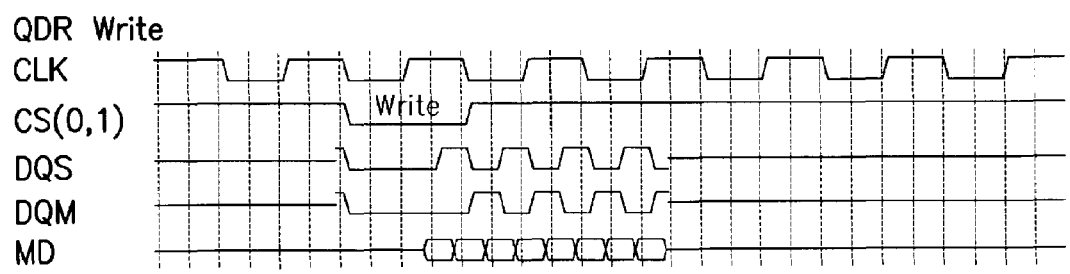
FIG. 5 is a timing diagram of the present invention depicting a writing of the QDR structure.

Referring to FIG. 5, a timing diagram for a writing of the QDR structure is depicted. CLK denotes a memory clock signal. When chip selection signal CS (0,1) is active, the QDR structure starts its operation. According to the instant figure, data selection signal (DQS) processes a frequency that is twice the frequency of memory clock signal (CLK). Data mask signal (DQM) is the reverse of data selection signal (DQS). The memory data signal (MD) and the data selection signal (DQS) coming from the memory controller 102 possess a predetermined phase difference, usually one quarter of the memory clock cycle. Therefore, buffer chip 108 may lock data of the memory data signal (MD) and transmit the same to the two memory banks 104, 106 respectively according to data selection signal (DQS) and the data mask signal (DQM).

Figure 6:
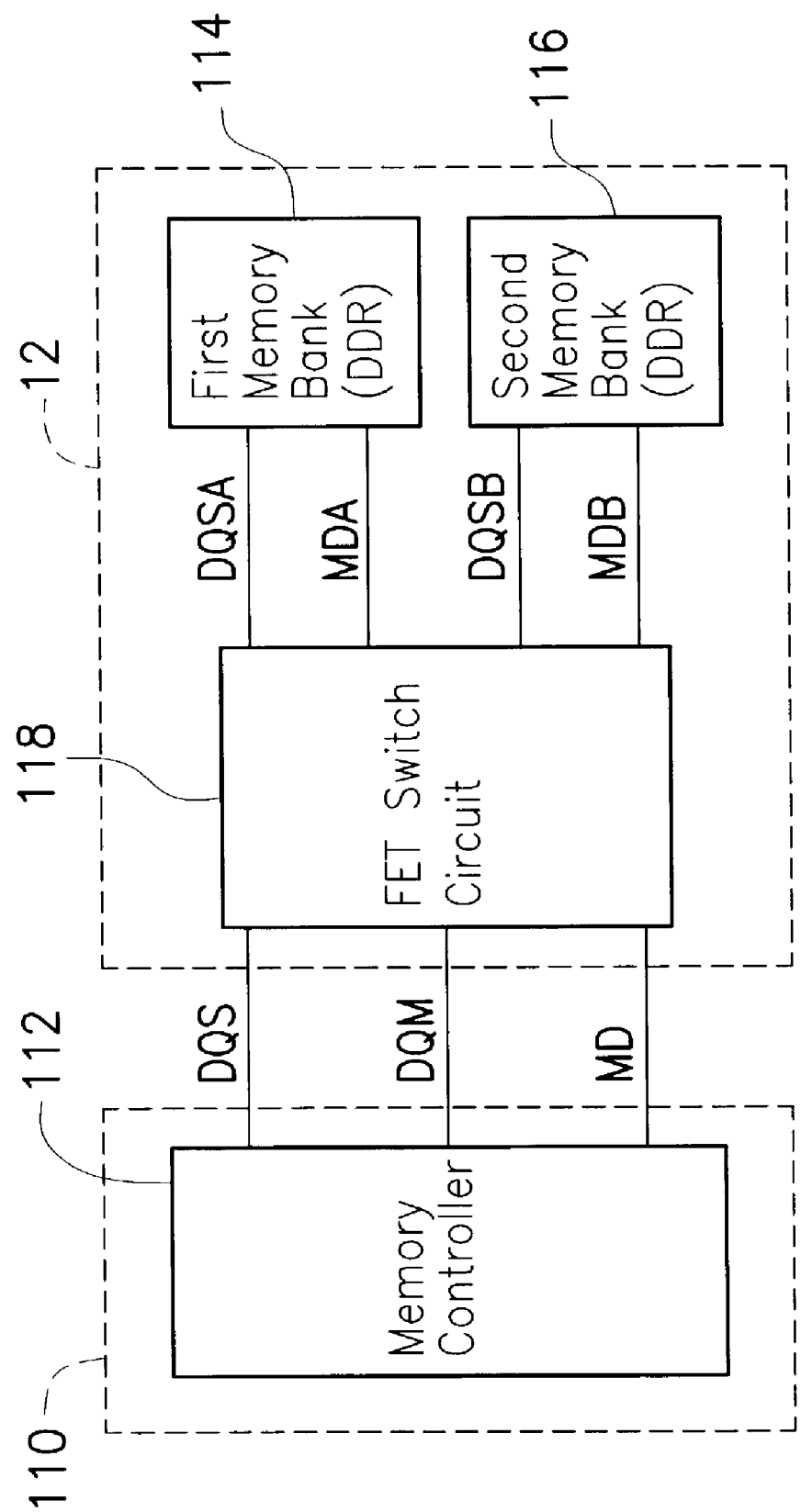
FIG. 6 is a block diagram of the present invention depicting the memory controller coupled to a QBM structure.

In addition, a commonly known technology, Quad Band Memory (QBM) that may be controlled by memory controller 112 is shown in FIG. 6. QBM structure includes field effect transistor (FET) switch circuit 118, a first memory bank DDR SDRAM 114, and a second memory bank DDR SDRAM 116. According to the instant figure, QBM structure 12 uses FET switch circuit 118 to double the transmission rate of the first data selection signal (DQSA) and data selection signal (MDA) of the first memory bank 114. Similarly, the transmission to the second memory bank 116 is doubled as well. Therefore, in a single memory clock cycle, four units of data are capable of being transmitted.

Figure 7:
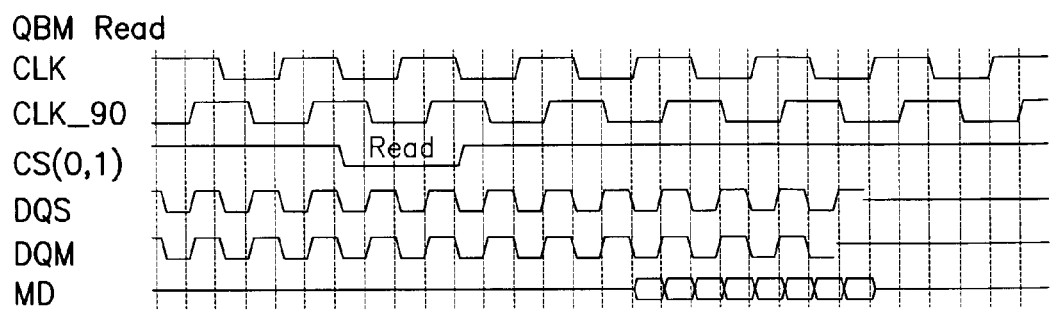
FIG. 7 is a timing diagram of the present invention depicting a reading using QBM.

Referring to FIG. 7, a timing diagram of QBM reading process is shown. CLK denotes a memory clock signal. Furthermore, a second memory clock signal CLK_90 which possesses a ¼ cycle phase difference with CLK is shown. When chip selection signal CS (0,1) is activated, QBM structure starts a reading process. According to the instant figure, QBM structure's data selection signal (DQS) and data mark signal (DQM) possess a frequency that is twice the frequency of memory clock signal (CLK). Furthermore, the memory data signal (MD), relating to FET switch circuit 118, correspond with the rising and falling edges of data selection signal (DQS). Therefore, memory controller 112 needs to delay the data selection signal (DQS) or data mask signal (DQM) for a predetermined time segment in order to lock data carried by memory data signal (MD). The locking of data is accomplished by the delay or time lag working in combination with a reference voltage (not shown).

Figure 8:
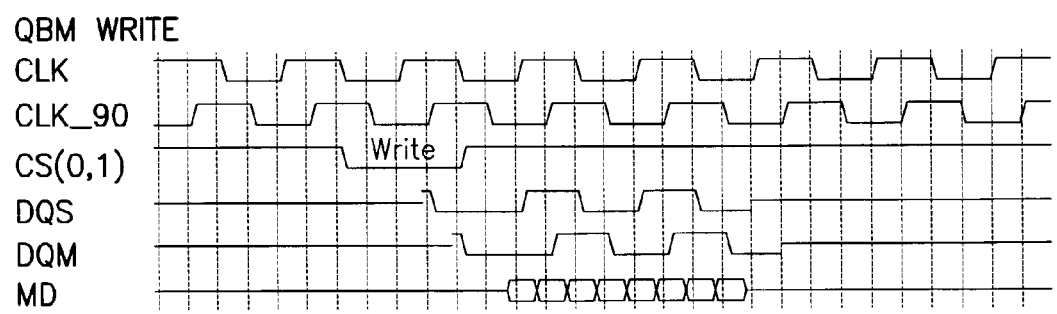
FIG. 8 is a timing diagram of the present invention depicting a writing using QBM.

Referring to FIG. 8, a timing diagram depicting the writing process of QBM is shown. CLK denotes a memory clock signal. Furthermore, a second memory clock signal CLK_90 which possesses a ¼ cycle phase difference with CLK is shown. When chip selection signal CS (0,1) is activated, QBM structure starts the writing process. According to the instant figure, memory controller 112 may output data selection signal (DQS) having a corresponding relationship with CLK. On the other hand, data mask signal (DQM) has a corresponding relationship with CLK_90. Memory data signal (MD) has a corresponding relationship with a memory clock signal having twice the frequency of CLK with a time lag of usually ¼ cycle. This memory clock signal is defined as CLK2X (not shown). The field effect transistor switch circuit 118 is capable of sequentially locking information or data carried by memory data signal (MD) according to data selection signal (DQS) and data mask signal (DQM). In addition, field effect transistor switch circuit 118 transmits information carried by memory data signal (MD) to the two memory banks 114, 116 respectively.

As can be appreciated, during the writing process of the memory described supra, memory controller 112, 102 needs to provide the following reference timing clock signals to DDR SDRAM. This is true in either QDR structure, or QBM structure. The reference timing clock signals are depicted in table 1.

TABLE 1

Various timing signals' correlation with control and data signals

|  | DDR | QDR | QBM |
|---|---|---|---|
| DQS generation | CLK | CLK2X | CLK |
| DQM generation | CLK_90 | CLK2X# | CLK_90 |
| MC write data control | CLK_90 | CLK2X_90 | CLK2X_90 |

Figure 9:
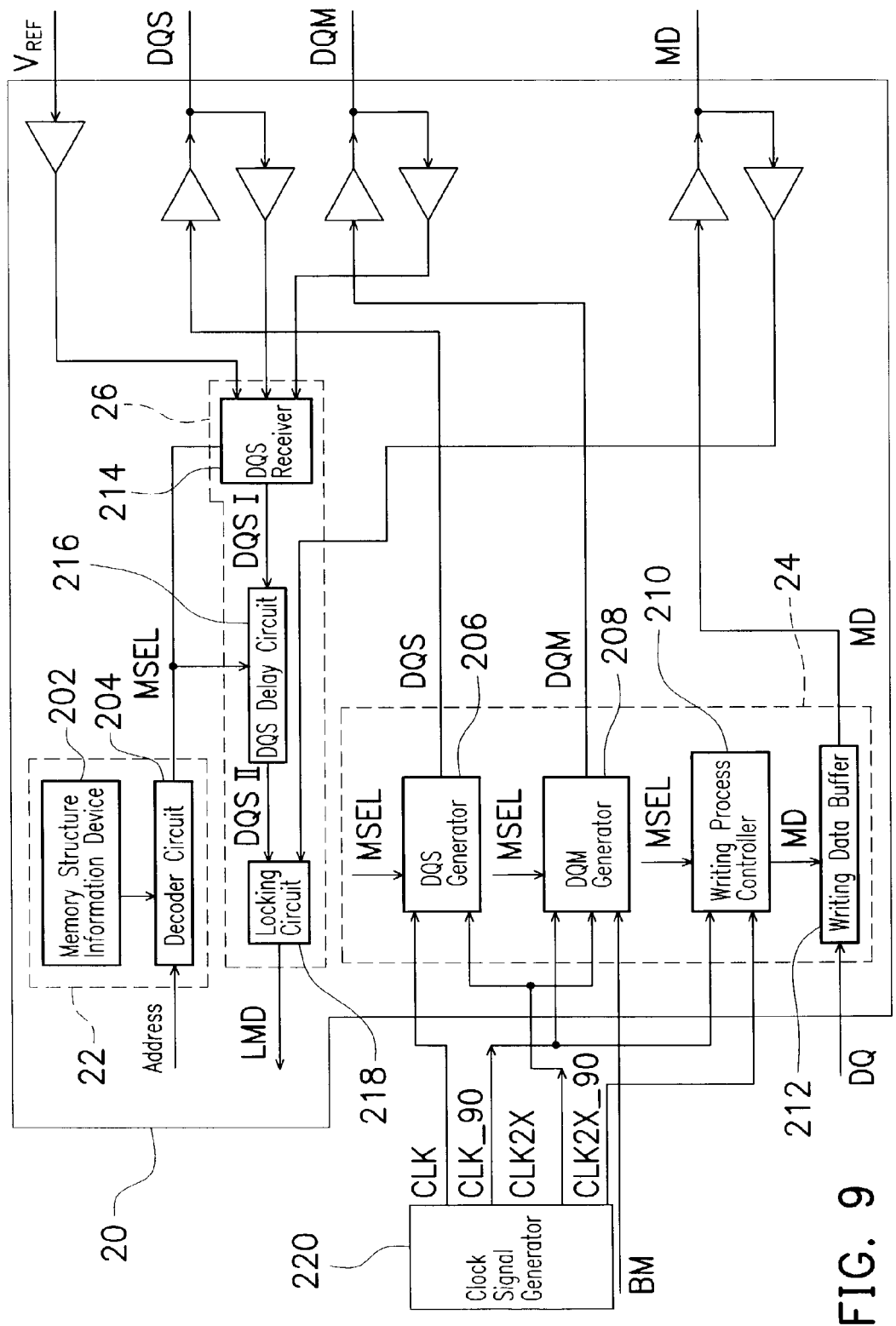
FIG. 9 is a preferred embodiment of the memory controller, wherein different memory modes are supported.

In order to let controller chip 100, 110 to simultaneously support all the DDR SDRAM structures described supra, the instant invention provide a memory controller 20 as shown in FIG. 9.

Referring to FIG. 9, the memory controller 20 includes a determining device 22, a memory writing device 24, and a memory reading device 26. A clock signal generator 220 is provided which are capable of at least generating memory clock signal CLK; a second signal that possesses a ¼ cycle delay in relation to CLK, i.e. CLK_90; a third signal that possesses twice the frequency of CLK, i.e.CLK2X; a fourth signal that possesses a twice reverse the frequency of CLK, i.e.CLK2X#, and a fifth signal that possesses twice the frequency of CLK combined with a ¼ cycle delay, i.e. CLK2X_90.

Determining device 22 includes memory structure information device 202 and decoder circuit 204. Information on the structure or mode of the corresponding memory type is stored in the memory structure information device 202. The information includes information relating to the QDR structure and the QBM structure described supra. The decoder circuit 204 receives memory address information. Decoder circuit 204 further provides a memory selection signal (MSEL), wherein information regarding memory type or mode is contained. The memory mode includes DDR SDRAM mode, QDR mode, and QBM mode.

Memory writing device 24 receives memory selection signal (MSEL) provided by memory determining device 22. The memory writing device 24 includes a data selection (DQS) generator 206, a data mask (DQM) generator 208, a writing process controller 210, and a writing data buffer 212.

When memory mode is DDR SDRAM, memory selection signal (MSEL) informs the same to memory writing device 24 thereby data selection (DQS) generator 206 may select a suitable memory clock signal among a plurality of clock signals as the data selection signal (DQS). In this case, CLK is selected. On the other hand, DQM generator 208 selects byte mask data as the data mask signal (DQM) which is coordinated with CLK_90. Similarly, writing process controller 210 selects CLK_90 and transmits data within the writing data buffer 212 to memory data signal (MD).

When memory mode is the QDR structure, memory selection signal (MSEL) notifies memory writing device 24. Accordingly, DQS generator 206 selects CLK2X as data selection signal (DQS). The DQM generator 208 selects CLK2X# as data mask signal (DQM). The writing process controller 210 selects CLK2X_90 as memory clock signal. Data within writing data buffer 212 is transmitted via data signal (MD) accordingly.

When memory mode is the QBM structure, memory selection signal (MSEL) notifies memory writing device 24. DQS generator 206 selects CLK as data selection signal (DQS). The DQM generator 208 selects CLK2X_90 as data mask signal (DQM). The writing process controller 210 selects CLK2X_90 as memory clock signal. Data within writing data buffer 212 is transmitted via data signal (MD) accordingly.

Memory reading device 26 receives memory selection signal (MSEL) provided by determining device 22. Memory reading device 26 includes DQS receiver 214, DQS delay circuit 216, and locking circuit 218.

In addition, when memory mode is DDR SDRAM, memory selection signal (MSEL) notifies memory reading device 26 thereby causing DQS receiver 214 to generate a locking signal. The locking signal comprises a differential input signal comprising the combination of data selection signal DQS and a reference voltage (VREF). The differential input signal is further delayed by DQS delay circuit 216 for a predetermined time segment which is usually ¼ cycle. Locking circuit 218 locks information transmitted via data signal (MD) accordingly.

When memory mode is the QDR structure, memory selection signal (MSEL) notifies the same to memory reading device 26 thereby DQS receiver 214 selects a second differential input signal. The second differential input signal includes a combination of data selection signal (DQS) and data mask signal (DQM). The second differential input signal is further delayed on DQS delay circuit 216 for a predetermined time segment before locking circuit 218 locks the information on the data signal (MD). The delayed time segment has a length of about ¼ cycle of the data selection signal according to the second differential input signal.

When memory mode is the QBM structure, memory selection signal (MSEL) notifies the same to memory reading device 26 thereby DQS receiver 214 selects a third differential input signal. The third differential input signal includes a combination of data selection signal (DQS) and the reference voltage (VREF). The third differential input signal is further delayed on DQS delay circuit 216 by a predetermined time segment before locking circuit 218 locks the information on the data signal (MD). The delayed time segment has a length of about ¼ cycle of the data selection signal according to the second differential input signal.

DQS receiver 214 may be formed in various ways including the following two ways. For the first of the two ways of forming DQS receiver 214, refer to FIG. 10, wherein a real-life example of a DQS receiver 214 is shown.

Figure 10:
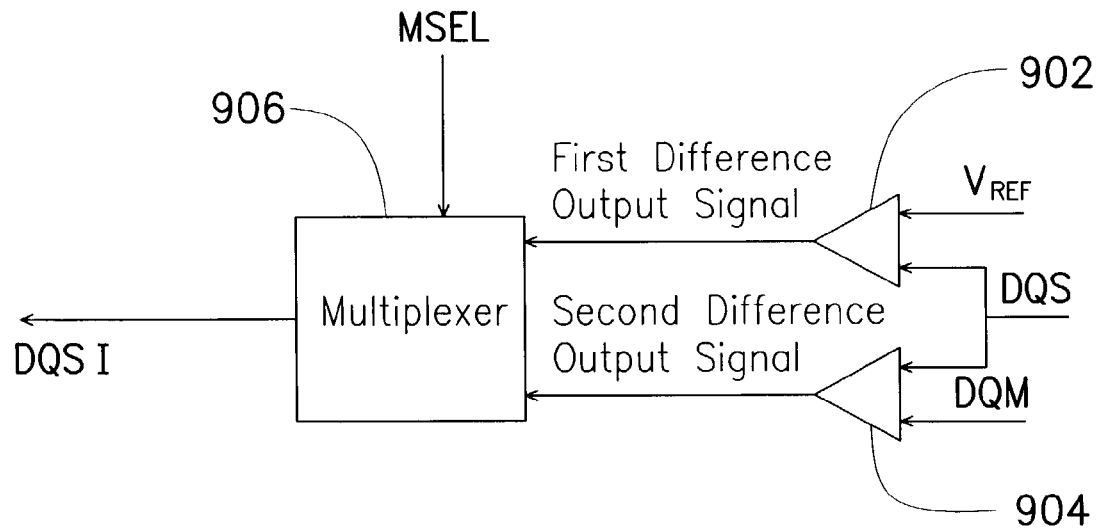
FIG. 10 is a first embodiment of a DQS receiver according to the present invention.

Referring now to FIG. 10, the DQS receiver 214 includes a first differential buffer 902, a second differential buffer 904, and a multiplexer 906. First differential buffer 902 is used for comparing data selection signal DQS and reference voltage (VREF). Based upon the comparison, a first differential output signal is generated. Second differential buffer 904 is used for comparing data selection signal DQS and data mask signal (DQM). Based upon the comparison, a second differential output signal is generated.

Multiplexer 906 is used to receive the first differential output signal and the second differential output signal. Based on the control of memory selection signal (MSEL), multiplexer 906 selectively permits either the first differential output or the second differential output to pass therethrough. The differential outputs that is permitted to pass through multiplexer 906 is defined as DQS I. DQS I is selected by the multiplexer to be the first differential output signal when the memory modes are DDR SDRAM, or QBM structure. On the other hand, when the memory mode is QDR structure, multiplexer selects the first differential output signal as DQS I.

Figure 11:
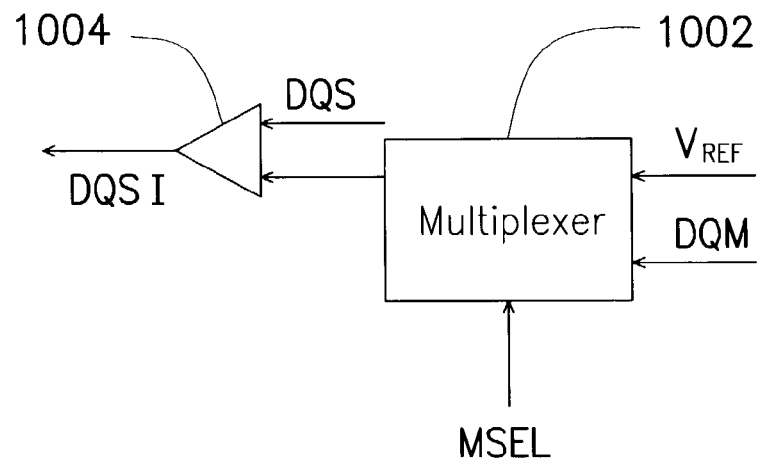
FIG. 11 is a second embodiment of a DQS receiver according to the present invention.

With regard to the second of the two ways of forming DQS receiver 214, refer to FIG. 11, wherein a real-life example of a DQS receiver 214 is shown. This receiver 214 includes a buffer 1004, and a multiplexer 1002. Multiplexer 1002 is used for receiving reference voltage VREF and data mask signal (DQM). Based on the control of memory selection signal (MSEL), multiplexer 906 selects either reference voltage VREF or data mask signal (DQM) for comparison with data selection signal (DQS). Upon comparison, buffer 1004 generates differential output signal and defined the same as DQS I. If memory modes are DDR SDRAM or QBM structure, multiplexer 1002 selects reference voltage VREF to compare with data selection signal (DQS) for the generation of DQS I. If the memory mode is QDR structure, multiplexer 1002 selects memory selection signal (MSEL) for comparison with data selection signal (DQS) to generate DQS I.

Figure 12:
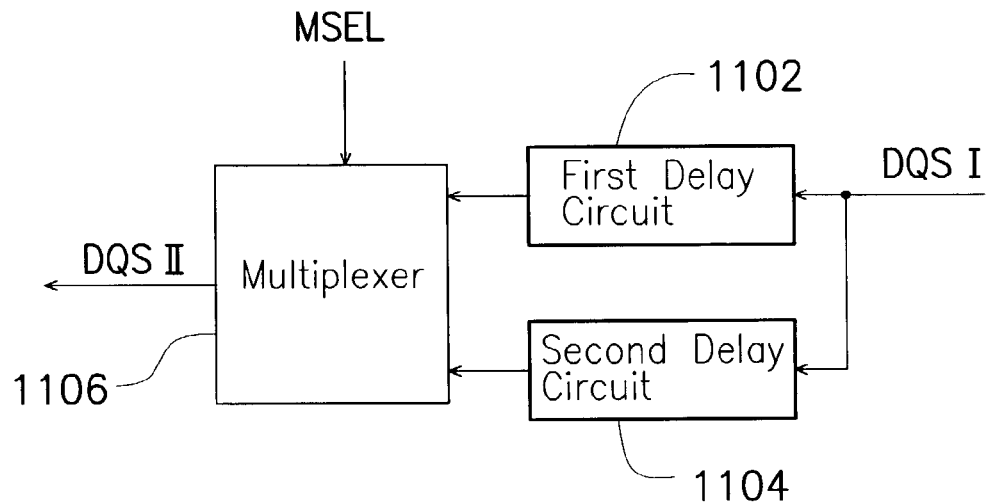
FIG. 12 is a first embodiment of a delay circuit according to the present invention.

In addition, DQS delay circuit 216 may be formed in two different ways. A first way of forming the delay circuit 216 is shown in FIG. 12 which is based on a practical application. The delay circuit 216 includes a first delay circuit 1102, a second delay circuit 1104, and a multiplexer 1106. First delay circuit 1102 is disposed to receive DQS I and delay the same for a predetermined time segment if required. For example, the predetermined time segment may be equal to ¼ cycle of a memory clock signal. Second delay circuit 1104 is disposed to receive DQS I and introduce a delay based upon the four unit data transmission rate such as QDR or QBM structure. A second delay time segment is required before coupling with multiplexer 1106. For example, second delay time segment may be equal to ⅛ cycle of a memory clock signal. The output DQS II of multiplexer 1106 is based upon a selection from either the output of the first delay circuit 1102, or the output of the second delay circuit 1104. The selection depends upon memory selection signal (MSEL).

Figure 13:
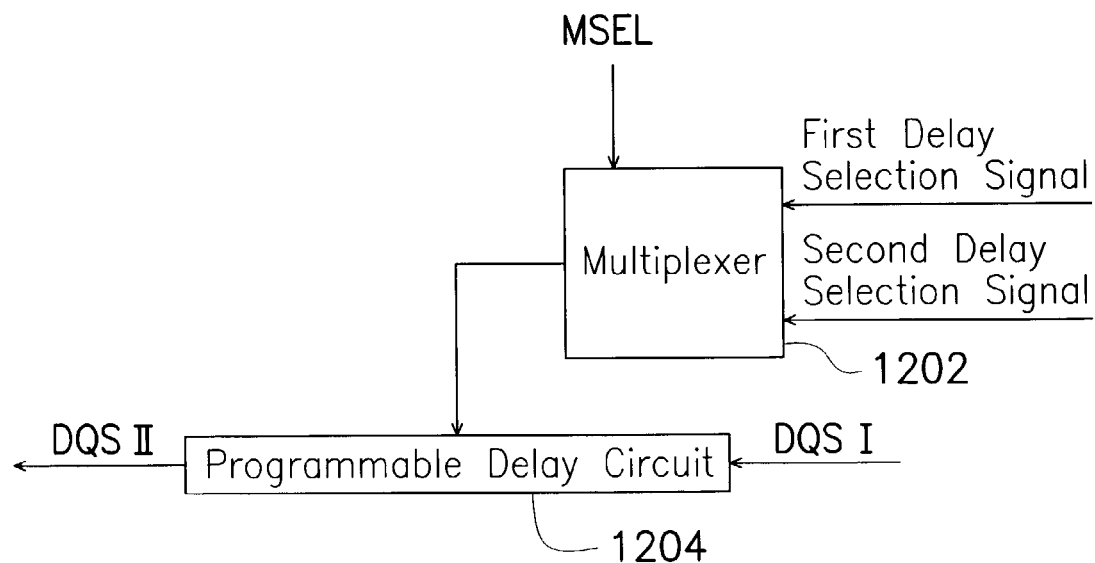
FIG. 13 is a second embodiment of a delay circuit according to the present invention.

A second way of forming the delay circuit 216 is shown in FIG. 13 which is based on a practical application. The delay circuit 216 includes multiplexer 1202, and a programmable delay circuit 1204. Multiplexer 1202 selectively outputs either a first delay selection signal or a second delay selection signal according to memory selection signal (MSEL). The selected output is further conveyed to programmable delay circuit 1204. If memory mode is DDR SDRAM, multiplexer 1202 selects the first delay selection signal and conveys the same to the programmable delay circuit 1204. Further, DQS I is delayed ¼ cycle and outputted as DQS II. If memory mode is QDR or QBM structure, multiplexer 1202 selects the second delay selection signal and conveys the same to programmable delay circuit 1204. Further, DQS I is delayed ⅛ cycle and outputted as. DQS II.

Finally, locking circuit 218 may lock information carried on memory data signal (MD) according to DQS II signal.

In summary, there are at least several advantages in the invention, which are as followed. (1) The memory controller of the invention supports different memory modes by providing a determining device, a memory writing device, and a memory reading device. (2) Motherboard manufacturing companies can only use one memory controller of the invention into their motherboards to support different memory modes, by which costs of the motherboards can be significantly reduced. (3) End-users can use memory devices with different memory modes in the same motherboard by incorporating the controller of the invention therein, which is more convenient and saving expenses.

in my regard It should be understood, of course, that the foregoing relates to preferred embodiments of the invention and that modifications may be made without departing from the spirit and scope of the invention as set forth in the following claims.

What is claimed is:

1. A memory controller for supporting different memory modes, the memory controller comprising:
   a determining device for determining a memory mode, the determining device generating a memory selection signal;
   a memory writing device using the memory selection signal to provide a data selection signal, wherein the data selection signal is chosen from a first clock signal or a second clock signal, the memory writing device further providing a data mask signal, wherein the data mask signal is chosen among a byte mask signal, a third clock signal, or a fourth clock signal, the memory writing device still further providing a memory data signal, wherein multiunit data are adapted to be carried therein, the memory data signal being controlled by the fourth clock signal or a fifth clock signal; and
   a memory reading device for receiving the data selection signal, the data mask signal, and a reference voltage, the memory reading device providing at least one differential signal and choosing one differential signal based upon the memory selection signal and delaying the one differential signal for a predetermined time period for locking data on the memory data signal.

2. The memory controller of claim 1, wherein the memory reading device includes a data selection receiver, comprising:
   a first differential buffer for comparing the data selection signal with a reference voltage and providing a first differential output signal;
   a second differential buffer for comparing the data selection signal with a data mask signal and providing a second differential output signal; and
   a multiplexer for selecting an output thereof from the first differential output signal or the second differential output signal according to a memory selection signal.

3. The memory controller of claim 1, wherein the memory reading device includes a data selection receiver, comprising:
   a multiplexer for generating an output by selecting from the reference voltage or the data mask signal as output according to the memory selection signal; and
   a differential buffer for comparing data selection signal with the output and providing a third differential signal.

4. The memory controller of claim 1, wherein the memory reading device includes a data selection signal delay circuit, comprising:
   a first delay circuit for receiving one of the at least one differential signal, and after delaying the one of the at least one differential signal for a first predetermined time period, the first delay circuit providing a first delay signal;
   a second delay circuit for receiving one of the at least one differential signal, and after delaying the one of the at least one differential signal for a second predetermined time period, the second delay circuit providing a second delay signal; and
   a multiplexer for providing an output, wherein the output is based upon a selection between the first delay signal or the second delay signal and having the selection based upon information carried by the memory selection signal.

5. The memory controller of claim 1, wherein the memory reading device includes a data selection signal delay circuit, comprising:
   a multiplexer for providing an output selected from one of a first delay selection signal and a second delay selection signal in accordance with information contained within the memory selection signal; and
   a programmable delay circuit, receiving the one differential signal, and using one of the first delay selection signal and a second delay selection signal, for providing a programmable delay time period for delaying the one differential signal for locking data on the memory data signal.

6. The memory controller of claim 1, wherein the different memory modes includes DDR SDRAM, QDR structure, and QBM structure.

7. A memory controller for supporting different memory modes, the memory controller comprising:
   a determining device for determining a memory mode, the determining device generating a memory selection signal;
   a memory writing device using the memory selection signal to provide a data selection signal, wherein the data selection signal is a first clock signal, the memory writing device further provides a data mask signal, wherein the data mask signal is chosen from a byte mask signal or a second clock signal, the memory writing device still further providing a memory data signal, wherein multiunit data are adapted to be carried therein, the memory data signal being controlled by the second clock signal or a third clock signal; and
   a memory reading device for receiving the data selection signal, the data mask signal, and a reference voltage, the memory reading device providing a differential signal and choosing the differential signal based upon the memory selection signal and delaying the differential signal for a predetermined time period for locking data on the memory data signal.

8. The memory controller of claim 7, wherein the different memory modes includes DDR SDRAM, or QBM structure.

9. The memory controller of claim 7, wherein the memory reading device comprises a receiver used in a memory controller for supporting different memory modes, the receiver comprising:
   a first differential buffer for comparing the data selection signal with the reference voltage and providing a first differential output signal;
   a second differential buffer for comparing data selection signal with a data mask signal and providing a second differential output signal; and
   a multiplexer for selecting an output thereof between the first differential output signal or the second differential output signal according to a memory selection signal.

10. The memory controller of claim 7, wherein the memory reading device comprises a receiver used in a memory controller disposed to use a plurality of clock signals for supporting different memory modes, the receiver comprising:

a multiplexer for generating an output by selecting from a reference voltage or a data mask signal as an output according to the memory selection signal; and a differential buffer for comparing data selection signal with the output and providing a third differential signal.

11. The memory controller of claim 7, wherein the memory reading device comprises a data selection signal delay circuit adapted to be used in a memory controller disposed to use a plurality of clock signals for supporting different memory modes, the data selection signal delay circuit comprising:

a multiplexer for providing an output selected from one of a first delay selection signal and a second delay selection signal in accordance with information contained within the memory selection signal; and a programmable delay circuit, receiving the one differential signal, and using one of the first delay selection signal and a second delay selection signal, for providing a programmable delay time period for delaying the one differential signal.

12. A data selection signal delay circuit adapted to be used in a memory controller for supporting different memory modes, the data selection signal delay circuit comprising:

a first delay circuit for receiving a differential signal, and after delaying the differential signal for a first predetermined time period, the first delay circuit providing a first delay signal;

a second delay circuit for receiving the differential signal, and after delaying the differential signal for a second predetermined time period, the second delay circuit providing a second delay signal; and a multiplexer for providing an output, wherein the output is based upon a selection between the first delay signal or the second delay signal and having the selection based upon information carried by a memory selection signal.

13. A controller coupled to a memory having a plurality of memory types, the controller being adapted to use at least one clock signal of a signal generator, the controller comprising:

a determining device for determining a memory type, the determining device generating a memory type signal relating to the memory type;

a writing device coupled to the determining device adapted to receive the memory type signal, the writing device processing received data according to the memory type signal and further providing a data mask signal chosen from a byte mask signal and a plurality of clock signals; and a reading device in information communication with the writing device and coupled to the determining device adapted to receive the memory type signal, the reading device being adapted to delay signals provided by the writing device passing therethrough for a predetermined time period and capture the same signals provided by the writing device thereafter, thereby different memory types are capable of being processed using a single controller.

14. A method for a memory controller adapted to control a plurality of memory types, comprising the steps of:

determining a memory type;

generating a memory type signal;

providing a data mask signal chosen from a byte mask signal and a plurality of clock signals;

receiving a memory data signal including the data mask signal;

delay the memory data signal for a predetermined time period according to the memory type signal; and capturing the memory data.

* * * * *